United States Patent
Tai et al.

(10) Patent No.: US 9,958,596 B2
(45) Date of Patent: May 1, 2018

(54) DISPLAY DEVICE, MULTILAYER LIGHT GUIDE PLATE STRUCTURE AND FRONT LIGHT MODULE

(71) Applicant: E Ink Holdings Inc., Hsinchu (TW)

(72) Inventors: Sheng-Chieh Tai, Hsinchu (TW); I-Jeng Chen, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 311 days.

(21) Appl. No.: 14/828,529

(22) Filed: Aug. 18, 2015

(65) Prior Publication Data

US 2016/0131822 A1 May 12, 2016

Related U.S. Application Data

(60) Provisional application No. 62/078,435, filed on Nov. 12, 2014.

(30) Foreign Application Priority Data

Mar. 26, 2015 (TW) .............................. 104109726 A

(51) Int. Cl.
F21V 8/00 (2006.01)
(52) U.S. Cl.
CPC ......... G02B 6/0076 (2013.01); G02B 6/0065 (2013.01); G02B 6/0036 (2013.01)
(58) Field of Classification Search
CPC ... G02B 6/0076; G02B 6/0065; G02B 6/0036
USPC ............... 362/612, 615, 616, 628, 629
See application file for complete search history.

(56) References Cited

U.S. PATENT DOCUMENTS

| 7,165,856 B2 | 1/2007 | Tseng et al. |
| 7,667,788 B2 | 2/2010 | Lee et al. |
| 7,777,833 B2 | 8/2010 | Hwang et al. |
| 8,371,735 B2 * | 2/2013 | Chen .................... G02B 6/0035 362/332 |
| 8,668,372 B2 * | 3/2014 | Duerksen ............. G02B 6/0095 362/129 |

(Continued)

FOREIGN PATENT DOCUMENTS

| TW | 200617504 | 6/2006 |
| TW | 201241687 | 10/2012 |
| TW | M453865 | 5/2013 |

OTHER PUBLICATIONS

"Office Action of Taiwan Counterpart Application," dated Jan. 26, 2016, p. 1-p. 14.

*Primary Examiner* — Laura Tso
(74) *Attorney, Agent, or Firm* — JCIPRNET

(57) ABSTRACT

A display device that includes a display panel, a multilayer light guide plate structure, and a light source is provided. The display panel has a display surface. The multilayer light guide plate structure is located on the display surface of the display panel. The multilayer light guide plate structure has a light incident surface, an upper surface, and a lower surface opposite to the upper surface, and the multilayer light guide plate structure includes a plurality of light guide plate layers stacked together. The light source is located beside the light incident surface of the multilayer light guide plate structure and has a light emitting surface. A multilayer light guide plate structure and a front light module are also provided.

23 Claims, 1 Drawing Sheet

(56) References Cited

U.S. PATENT DOCUMENTS

| | | | |
|---|---|---|---|
| 8,882,328 B2* | 11/2014 | Kinder | G02B 6/0028 |
| | | | 362/615 |
| 2004/0095740 A1 | 5/2004 | Mai et al. | |
| 2006/0245061 A1 | 11/2006 | Choi et al. | |
| 2008/0232135 A1* | 9/2008 | Kinder | G02B 6/0053 |
| | | | 362/615 |
| 2010/0020566 A1 | 1/2010 | Teng | |
| 2011/0176313 A1 | 7/2011 | Wang et al. | |
| 2012/0257409 A1 | 10/2012 | Huang et al. | |
| 2012/0262413 A1* | 10/2012 | Huang | G06F 3/042 |
| | | | 345/174 |
| 2012/0281430 A1 | 11/2012 | Huang et al. | |
| 2013/0107577 A1 | 5/2013 | Chang et al. | |
| 2013/0301300 A1* | 11/2013 | Duerksen | G02B 6/0095 |
| | | | 362/627 |
| 2014/0029295 A1 | 1/2014 | Hsiao et al. | |
| 2014/0029298 A1 | 1/2014 | Hyun et al. | |
| 2014/0104542 A1 | 4/2014 | Imamura et al. | |
| 2014/0133182 A1 | 5/2014 | Yao et al. | |
| 2014/0293190 A1* | 10/2014 | Nakashima | G02B 6/0035 |
| | | | 349/65 |

* cited by examiner

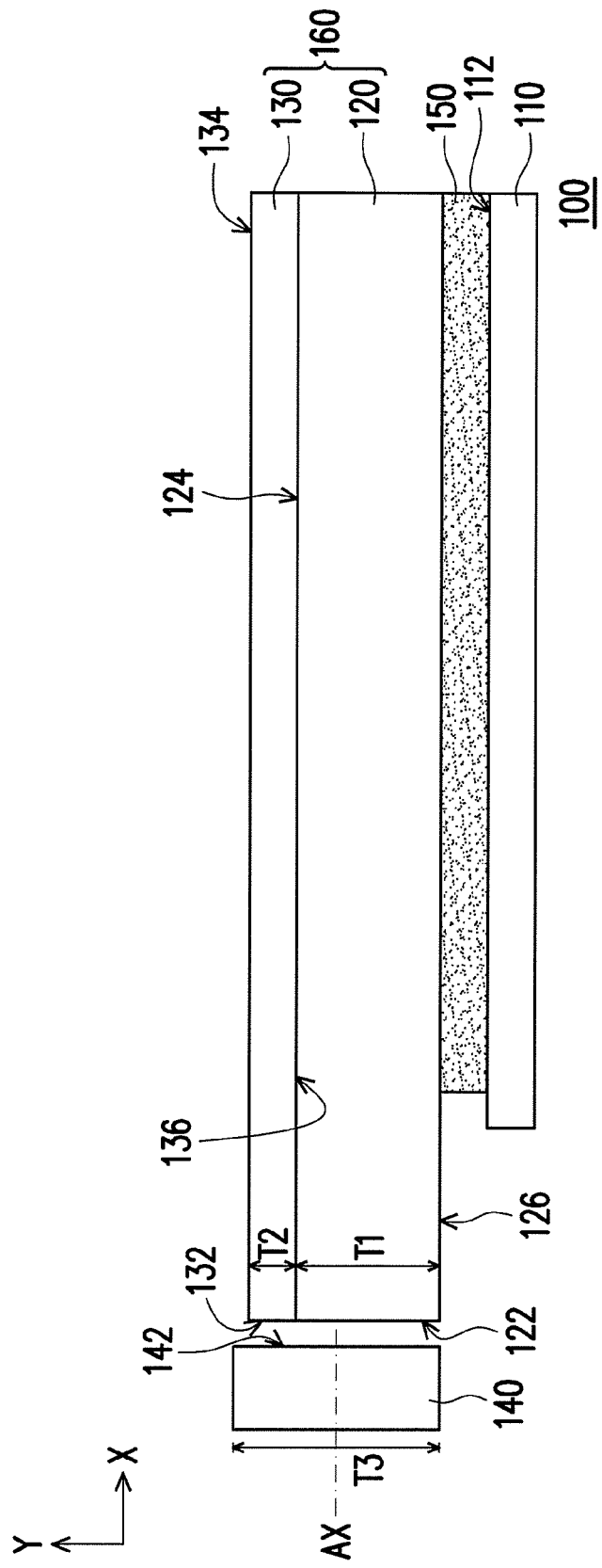

DISPLAY DEVICE, MULTILAYER LIGHT GUIDE PLATE STRUCTURE AND FRONT LIGHT MODULE

CROSS-REFERENCE TO RELATED APPLICATION

This application claims the priority benefits of U.S. provisional application Ser. No. 62/078,435, filed on Nov. 12, 2014 and Taiwan application serial no. 104109726, filed on Mar. 26, 2015. The entirety of each of the above-mentioned patent applications is hereby incorporated by reference herein and made a part of this specification.

BACKGROUND OF THE INVENTION

Field of the Invention

The invention relates to a front light module and a display device. More particularly, the invention relates to a front light module having a multilayer light guide plate (LGP) structure and a display device having the multilayer LGP structure.

Description of Related Art

Generally, a normal front light illumination device applicable to a display device is equipped with a light guide plate (LGP) that requires an outer protection component acting as a protection film, such that the LGP can be protected from being scratched by a user. Since a reflection beam generated by an outer beam irradiating the protection film may discomfort the user, the protection film often undergoes an anti-glare treatment or a hard coating treatment. Specifically, an optical clear adhesive (OCA) is coated onto or adhered to the protection film in a bulk roll manner, and the OCA and the protection film are cut into sheet materials with proper size according to actual demands and are adhered to the LGP (the LGP is jacketed). During the process of jacketing the LGP, impurities are very much likely to be attached between the LGP and the OCA, which lowers the overall yield.

SUMMARY OF THE INVENTION

The invention is directed to a front light module having a multilayer light guide plate (LGP) structure and a display device having the multilayer LGP structure, and the resultant front light module and the resultant display device can be characterized by high manufacturing yield.

In an embodiment of the invention, a display device that includes a display panel, a multilayer LGP structure, and a light source is provided. The multilayer LGP structure is located on the display surface of the display panel. The multilayer LGP structure has a light incident surface, an upper surface, and a lower surface opposite to the upper surface, and the multilayer LGP structure includes a plurality of LGP layers stacked together or an LGP layer composed of multilayer materials. The light source is located beside the light incident surface of the multilayer LGP structure.

In an embodiment of the invention, a multilayer LGP structure that includes a first LGP layer and a second LGP layer is provided. The first LGP layer has an upper surface and a lower surface opposite to the upper surface. The second LGP layer is located on the upper surface of the first LGP layer and has a light incident surface, an upper surface, and a lower surface opposite to the upper surface. Here, the first LGP layer and the second LGP layer are formed by performing a co-extrusion process.

In an embodiment of the invention, a front light module that includes a first LGP layer, a second LGP layer, and a light source is provided. The first LGP layer has a light incident surface, an upper surface, and a lower surface opposite to the upper surface. The second LGP layer is located on the upper surface of the first LGP layer and has a light incident surface, an upper surface, and a lower surface opposite to the upper surface. The first LGP layer and the second LGP layer are formed by performing a co-extrusion process. The light source is located beside the light incident surface of the first LGP layer and the light incident surface of the second LGP layer and has a light emitting surface.

According to an embodiment of the invention, the multilayer LGP includes a first LGP layer and a second LGP layer. The first LGP layer is located on the display surface of the display panel and has a light incident surface, an upper surface, and a lower surface opposite to the upper surface. The second LGP layer is located on the first LGP layer and has a light incident surface, an upper surface, and a lower surface opposite to the upper surface.

According to an embodiment of the invention, the display device further includes an optical clear adhesive (OCA) layer located between the first LGP layer and the display panel.

According to an embodiment of the invention, a thickness of the first LGP layer is greater than a thickness of the second LGP layer.

According to an embodiment of the invention, a ratio of the thickness of the first LGP layer to the thickness of the second LGP layer is between about 1.05 to about 2.2.

According to an embodiment of the invention, a thickness range is defined by the light incident surface of the first LGP layer and the light incident surface of the second LGP layer in a reference direction, and a central axis of the light emitting surface of the light source is within the thickness range.

According to an embodiment of the invention, a material of the first LGP layer has a first refractive index, a material of the second LGP layer has a second refractive index, and the first refractive index is greater than the second refractive index.

According to an embodiment of the invention, a material of the first LGP layer includes a first polymer, a material of the second LGP layer includes a second polymer, and the first polymer is different from the second polymer.

According to an embodiment of the invention, the first polymer is polycarbonate (PC), and the second polymer is polymethyl methacrylate (PMMA).

According to an embodiment of the invention, the lower surface of the first LGP layer has a mesh point structure.

According to an embodiment of the invention, the upper surface of the second LGP layer undergoes an anti-glare treatment, a hard coating treatment, or an anti-reflection treatment.

According to an embodiment of the invention, the first LGP layer and the second LGP layer are formed by performing a co-extrusion process.

According to an embodiment of the invention, the light source includes at least one light emitting diode, and a widths of a light-emitting area of the light source in a reference direction is greater than, less than, or equal to a thickness of the first LGP layer in the reference direction.

In view of the above, the display device and the front light module described in an embodiment of the invention include the multilayer LGP structure made of composite materials;

thereby, the use of OCA may no longer be necessary, the jacketing process may be omitted, and the manufacturing yield can be enhanced.

Several exemplary embodiments accompanied with figures are described in detail below to further describe the invention in details.

BRIEF DESCRIPTION OF THE DRAWINGS

FIG. 1 is a schematic view illustrating a display device according to an embodiment of the invention.

DETAILED DESCRIPTION OF DISCLOSED EMBODIMENTS

FIG. 1 is a schematic view illustrating a display device according to an embodiment of the invention. Please refer to FIG. 1. The multilayer LGP structure 160 described in an embodiment of the invention is located on a display surface of a display panel. The multilayer LGP structure 160 has a light incident surface, an upper surface, and a lower surface opposite to the upper surface, and the multilayer LGP structure 160 includes a plurality of LGP layers stacked together or an LGP layer composed of multilayer materials. In the present embodiment, the LGP layers stacked together are, for instance, two LGP layers of a display device 100. The display device 100 includes a display panel 110, a first LGP layer 120, a second LGP layer 130, and a light source 140. Here, the first LGP layer 120, the second LGP layer 130, and the light source 140 may collectively act as a front light module for providing a display light source of the display device 100. The display panel 110 has a display surface 112. The first LGP layer 120 is located on the display surface 112 of the display panel 110. The first LGP layer 120 has a light incident surface 122, an upper surface 124, and a lower surface 126 opposite to the upper surface 124. The second LGP layer 130 is located on the first LGP layer 120. The second LGP layer 130 has a light incident surface 132, an upper surface 134, and a lower surface 136 opposite to the upper surface 134. The first LGP layer 120 and the second LGP layer 130 are formed by performing a co-extrusion process, which should however not be construed as a limitation to the invention. The light source 140 is located beside the light incident surface 122 of the first LGP layer 120 and the light incident surface 132 of the second LGP layer 130 and has a light emitting surface 142. According to the present embodiment, the display device 100 may further include an optical clear adhesive (OCA) layer 150 located between the first LGP layer 120 and the display panel 110 for adhering the display panel 110 and the first LGP layer 120.

In the present embodiment, to at least reduce the reflection beam generated by the outer beam irradiating the LGP layers and protect the LGP layers, the upper surface 134 of the second LGP layer 130 undergoes an anti-glare treatment, a hard coating treatment, or an anti-reflection treatment, whereby the reflection beam can be prevented from entering human eyes, and the surface hardness of the second LGP layer 130 can be increased. According to the present embodiment, once the second LGP layer 130 undergoes the hard coating treatment, the surface hardness of the second LGP layer 130 is one level higher than the level of the surface hardness of the first LGP layer 120 in a pencil hardness test, and thus the first LGP layer 120 and the second LGP layer 130 can be protected.

To be specific, the display panel 110 described in the present embodiment is, for instance, a reflective display panel (e.g., an electrophoretic display panel), while the invention is not limited thereto. The first LGP layer 120 and the second LGP layer 130 are located on the display surface 112 of the display panel 110, i.e., in front of the display panel 110, and therefore the assembly of the first LGP layer 120, the second LGP layer 130, and the light source 140 may be deemed as one front light module. Here, the light source is, for instance, constituted by a plurality of point light sources, e.g., a plurality of light emitting diodes (LEDs). In another embodiment, the light source 140 may also be a cold cathode fluorescent lamp (CCFL), which should not be construed as a limitation to the invention.

It should be mentioned that the anti-glare treatment, the hard coating treatment, or the anti-reflection treatment is directly performed on the upper surface 134 of the second LGP layer 130 of the display device 100 according to the present embodiment. Hence, it is neither necessary to form an additional protection film on the second LGP layer 130 nor required to adhere or coat an OCA to the second LGP layer 130. Hence, it is rather difficult for impurities to be attached between the second LGP 130 and the OCA, and the overall yield can be ameliorated.

In the present embodiment, to at least improve the display quality, a refractive index n1 of a material of the first LGP layer 120 is greater than a refractive index n2 of a material of the second LGP layer 130. Besides, in the present embodiment of the invention, the material of the first LGP layer 120 includes a first polymer, the material of the second LGP layer 130 includes a second polymer, the first polymer is polycarbonate (PC), for instance, and the second polymer is polymethyl methacrylate (PMMA), for instance. The first polymer and the second polymer are different materials according to the present embodiment. In order to prevent the material of the display panel 100 from being damaged by ultraviolet (UV) beams, UV absorption materials may be added to the first LGP layer 120 or the second LGP layer 130, and the first LGP layer 120 and the second LGP layer 130 may be formed by performing a co-extrusion process. However, the invention is not limited thereto. Additionally, according to the present embodiment, a thickness T1 of the first LGP layer 120 is greater than a thickness T2 of the second LGP layer 130. In the present embodiment, a ratio of the thickness T1 to the thickness T2 is between about 1.05 to about 2.2, for instance. Said design of thicknesses T1 and T2 allows a great portion of the beam emitted from the light source 140 to be transmitted through the first LGP layer 120. The beam can thus enter the first LGP layer 120 and the second LGP layer 130 at a proper incident angle, and the resultant image displayed on the display panel can have favorable display quality.

Moreover, in the present embodiment, a thickness range is defined by the light incident surface 122 of the first LGP layer 120 and the light incident surface 132 of the second LGP layer 130 in a reference direction. Here, the reference direction is a perpendicular direction Y, for instance, and the thickness range is the sum of the thickness T1 of the first LGP layer 120 and the thickness T2 of the second LGP layer 130, for instance. A central axis AX of the light emitting surface 142 of the light source 140 is within the thickness range. For instance, according to the present embodiment, the reference direction (i.e., the perpendicular direction Y) determined by the light source 140 may be parallel to the light incident surface 122 of the first LGP layer 120 and the light incident surface 132 of the second LGP layer 130. The central axis AX of the light emitting surface 142 is arranged between the lower surface 126 of the first LGP layer 120 and the upper surface 134 of the second LGP layer 130, i.e., between the thickness range T1+T2. Besides, in the present embodiment, a thickness T3 of the light source 140 in the direction Y may be greater than, less than, or equal to the thickness T1 of the first LGP layer 120 in the direction Y, such that the light guiding efficiency of the first and second LGP layers 120 and 130 can be improved. In FIG. 1, the thickness T3 of the light source 140 in the direction Y is greater than the thickness T1 of the first LGP layer 120 in the direction Y, for instance, and other thickness relations can be deduced therefrom. The invention is not limited to the embodiments provided herein. Here, the thickness T3 is, for instance, a width of a light-emitting area of a light source. The light-emitting area of a light source would be the light-emitting area of a light source module.

According to the present embodiment, the lower surface 126 of the first LGP layer 120 has a mesh point structure, for instance. The mesh point structure may be thermally compressed onto the material of the first LGP layer 120 in a bulk roll manner, for instance. Alternatively, the mesh point structure may be formed by coating the lower surface 126 of the first LGP layer 120 with UV curable film materials and curing the film materials by using UV beams after a heat embossing process is performed on the mesh point structure. The way to form the mesh point structure should not be limited to the embodiments provided herein.

To sum up, in an embodiment of the invention, the LGP structure of the display device and the LGP structure of the front light module each include a plurality of LGP layers, and the multilayer LGP structure is made of composite materials. The anti-glare treatment, the hard coating treatment, or the anti-reflection treatment is directly performed on the upper surface of the second LGP layer. Accordingly, it is not necessary to form an additional protection film on the second LGP layer, the manufacturing yield can be ameliorated, and the thickness of the display device can be reduced.

Although the invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. A display device comprising:
a display panel having a display surface;
a multilayer light guide plate structure located on the display surface of the display panel, the multilayer light guide plate structure having a light incident surface, an upper surface, and a lower surface opposite to the upper surface, the multilayer light guide plate structure comprising a plurality of light guide plate layers stacked together; and
a light source located beside the light incident surface of the multilayer light guide plate structure, the light source having a light emitting surface,
wherein the multilayer light guide plate structure comprises a first light guide plate layer and a second light guide plate layer, the first light guide plate layer is located on the display surface of the display panel and has a light incident surface, an upper surface, and a lower surface opposite to the upper surface, and the second light guide plate layer is located on the first light guide plate layer has a light incident surface, an upper surface, and a lower surface opposite to the upper surface, the upper surface of the second light guide plate layer undergoes an anti-glare treatment, a hard coating treatment, or an anti-reflection treatment.

2. The display device of claim 1, further comprising:
an optical clear adhesive layer located between the first light guide plate layer and the display panel.

3. The display device of claim 1, wherein a thickness of the first light guide plate layer is greater than a thickness of the second light guide plate layer.

4. The display device of claim 3, wherein a ratio of the thickness of the first light guide plate layer to the thickness of the second light guide plate layer is between about 1.05 to about 2.2.

5. The display device of claim 3, wherein a thickness range is defined by the light incident surface of the first light guide plate layer and the light incident surface of the second light guide plate layer in a reference direction, and a central axis of the light emitting surface of the light source is within the thickness range.

6. The display device of claim 1, wherein the first light guide plate layer has a first refractive index, the second light guide plate layer has a second refractive index, and the first refractive index is greater than the second refractive index.

7. The display device of claim 1, wherein a material of the first light guide plate layer comprises a first polymer, a material of the second light guide plate layer comprises a second polymer, and the first polymer is different from the second polymer.

8. The display device of claim 7, wherein the first polymer is polycarbonate.

9. The display device of claim 7, wherein the second polymer is polymethyl methacrylate.

10. The display device of claim 1, wherein the first light guide plate layer and the second light guide plate layer are formed by performing a co-extrusion process.

11. The display device of claim 1, wherein the light source comprises a light emitting diode, and a widths of a light-emitting area of the light source in a reference direction is greater than a thickness of the first light guide plate layer in the reference direction.

12. A multilayer light guide plate structure comprising:
a first light guide plate layer having an upper surface and a lower surface opposite to the upper surface; and
a second light guide plate layer located on the upper surface of the first light guide plate layer, the second light guide plate layer having an upper surface and a lower surface opposite to the upper surface, wherein the first light guide plate layer and the second light guide plate layer are formed by performing a co-extrusion process,
wherein the upper surface of the second light guide plate layer undergoes an anti-glare treatment, a hard coating treatment, or an anti-reflection treatment.

13. The multilayer light guide plate structure of claim 12, wherein a thickness of the first light guide plate layer is greater than a thickness of the second light guide plate layer.

14. The multilayer light guide plate structure of claim 12, wherein a ratio of a thickness of the first light guide plate layer to a thickness of the second light guide plate layer is between about 1.05 to about 2.2.

15. The multilayer light guide plate structure of claim 12, wherein the first light guide plate layer has a first refractive index, the second light guide plate layer has a second refractive index, and the first refractive index is greater than the second refractive index.

16. The multilayer light guide plate structure of claim 12, wherein a material of the first light guide plate layer comprises polycarbonate, and a material of the second light guide plate layer comprises polymethyl methacrylate.

17. A front light module comprising:
a first light guide plate layer having a light incident surface, an upper surface, and a lower surface opposite to the upper surface;
a second light guide plate layer located on the upper surface of the first light guide plate layer, the second light guide plate layer having a light incident surface, an upper surface, and a lower surface opposite to the upper surface; and
a light source located beside the light incident surface of the first light guide plate layer and the light incident surface of the second light guide plate layer, the light source having a light emitting surface, wherein the first light guide plate layer and the second light guide plate layer are formed by performing a co-extrusion process, wherein the upper surface of the second light guide plate layer undergoes an anti-glare treatment, a hard coating treatment, or an anti-reflection treatment.

18. The front light module of claim 17, wherein a thickness of the first light guide plate layer is greater than a thickness of the second light guide plate layer.

19. The front light module of claim 17, wherein a ratio of a thickness of the first light guide plate layer to a thickness of the second light guide plate layer is between about 1.05 to about 2.2.

20. The front light module of claim 17, wherein a thickness range is defined by the light incident surface of the first light guide plate layer and the light incident surface of the second light guide plate layer in a reference direction, and a central axis of the light emitting surface of the light source is within the thickness range.

21. The front light module of claim 17, wherein the first light guide plate layer has a first refractive index, the second light guide plate layer has a second refractive index, and the first refractive index is greater than the second refractive index.

22. The front light module of claim 17, wherein a material of the first light guide plate layer comprises polycarbonate, and a material of the second light guide plate layer comprises polymethyl methacrylate.

23. The front light module of claim 17, wherein the light source comprises a light emitting diode, and a widths of a light-emitting area of the light source in a reference direction is greater than, less than, or equal to a thickness of the first light guide plate layer in the reference direction.

* * * * *